Feb. 17, 1942.   G. M. BEIMER   2,273,504
MEANS FOR MOUNTING FIRE EXTINGUISHERS ON AUTOMOTIVE VEHICLES
Filed Dec. 5, 1940   3 Sheets-Sheet 1

INVENTOR
George M. Beimer
BY
A. D. T. Libby
ATTORNEY

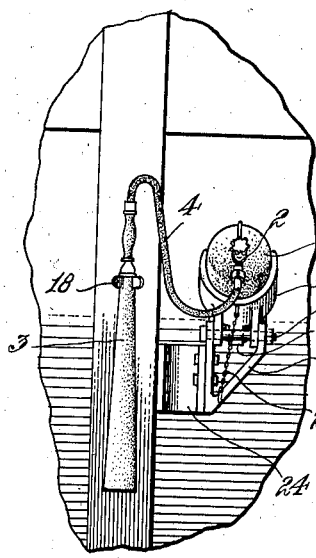
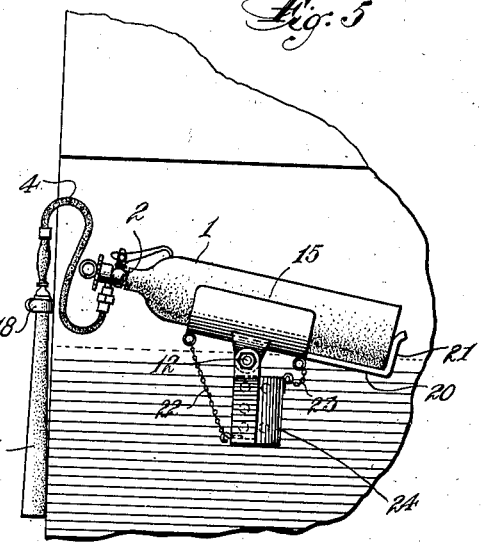
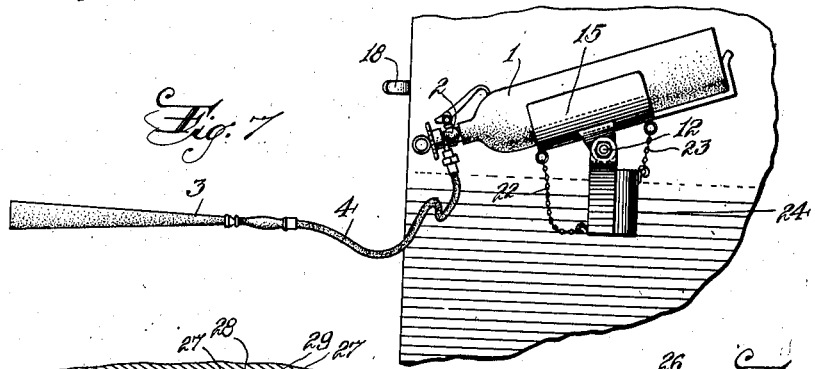
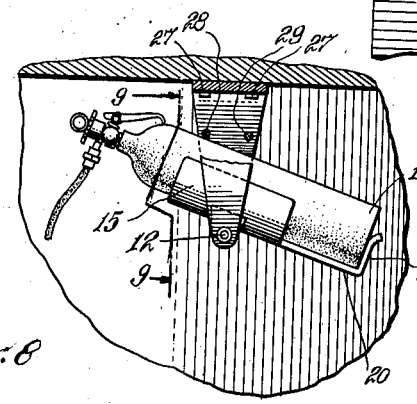
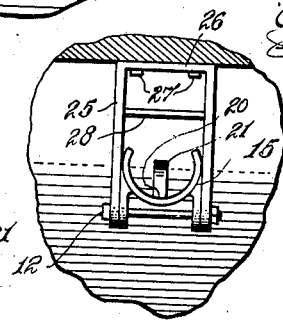

Feb. 17, 1942.   G. M. BEIMER   2,273,504
MEANS FOR MOUNTING FIRE EXTINGUISHERS ON AUTOMOTIVE VEHICLES
Filed Dec. 5, 1940   3 Sheets-Sheet 3
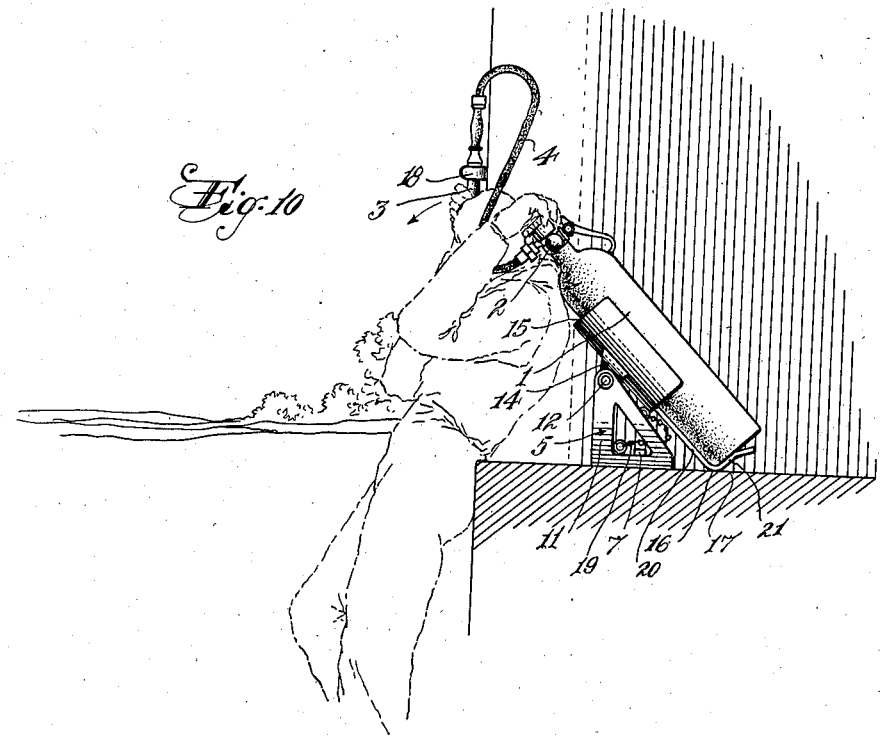
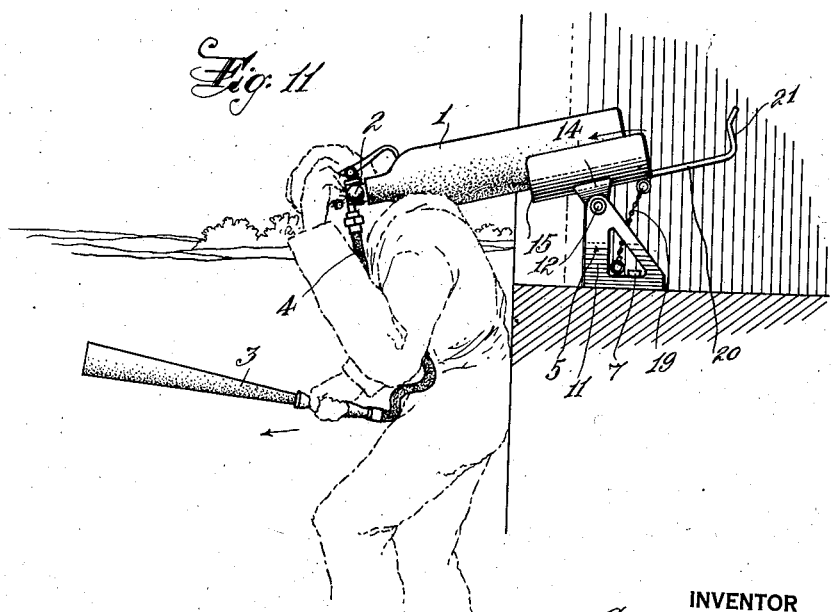
INVENTOR
George M. Beimer.
BY
A. D. T. Libby
ATTORNEY Patented Feb. 17, 1942

2,273,504

UNITED STATES PATENT OFFICE 2,273,504

MEANS FOR MOUNTING FIRE EXTINGUISHERS ON AUTOMOTIVE VEHICLES

George M. Beimer, Lodi, N. J., assignor to Couse Laboratories, Inc., Newark, N. J., a corporation of New Jersey Application December 5, 1940, Serial No. 368,643

6 Claims. (Cl. 248—140)

This invention relates to means for mounting a fire extinguisher, particularly on an automotive vehicle and especially one of the type such as shown in Couse Design Patent D–109,942, issued May 31, 1938.

So far as I am aware, it has been the practice in the past for one carrying a fire extinguisher in his automobile, truck or the like, to place this under the seat or in the rear compartment or baggage space, both of which places make it very inconvenient and sometimes impossible to get to the fire extinguisher in a hurry. When an accident occurs in vehicles of this kind in which a fire is started, the fire is usually very rapid in its progress, particularly if the fire starts, as it usually does, around the fuel tank. In some vehicles the fuel tank is mounted in the rear and in some, in the front, and consequently if a fire breaks out in either place, the extinguisher should be accessible for instantaneous use. A vehicle such as shown in the Couse patent, with its equipment, is a very expensive structure and in case of fire no time should be lost by the driver or occupant of the vehicle in being able to get hold of the fire extinguisher and getting it into operation.

Furthermore, an extinguisher satisfactory for use on a vehicle made according to the Couse patent is, when loaded, rather heavy and cannot readily be handled by an operator with his hands, the same as a small extinguisher. Therefore, the large-size extinguishers are carried on the back or shoulder of the operator, and it is therefore the principal object of my invention to provide a mounting for a fire extinguisher which will allow the same to be easily transferred from the mounting to the back or shoulder of an operator, or pulled out and taken in the hands of the operator, where the small size is used.

A further object of the invention is to provide a mounting for an extinguisher which is relatively cheap to manufacture and install.

My improved type of mounting will be readily understood by reference to the annexed drawings, wherein:

Figure 5 is a view similar to Figure 1, but showing a slightly modified form of holder for mounting the extinguisher on a side wall or frame member.

Figure 6 is a view of Figure 5 looking from left to right.

Figure 7 is a view similar to Figure 3 with the holder and extinguisher of Figure 5 moved to the discharge position.

Figure 8 shows a modified form of holder for mounting the extinguisher on a ceiling member.

Figure 9 is a view on the line 9—9 of Figure 8, without the fire extinguisher.

Figures 10 and 11 show how a large fire extinguisher may be easily transferred from its mounting to the back or shoulder of an operator.

Figure 2:
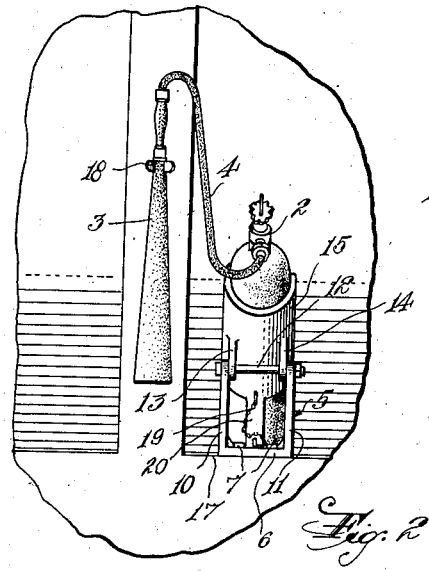
Figure 2 is a view of Figure 1, looking from left to right.

In the various views, wherein like numbers refer to corresponding parts, 1 is a fire extinguisher tube or container having a discharge valve 2 and a discharge nozzle 3 connected to the valve 2 by a flexible hose 4. The extinguisher 1 is carried by a mounting comprising a bracket 5 having a base portion 6 adapted to be fastened as by bolts or screws 7 to the floor or frame member of the vehicle. The bracket 5 has two side arms 8 and 9 which are joined to vertical members 10 and 11. A bolt 12 is carried at the apex of the triangularly shaped bracket 5 where the arms 8, 10 and 9, 11 meet. The bolt 12 passes through lugs 13 and 14 which are attached to a saddle 15 which is preferably made of metal which has considerable stiffness and resilience so as to hold the extinguisher 1 when the same is pushed into the saddle. While a stop device for engaging the end of the container may be fastened to a part of the vehicle, I prefer to provide the saddle 15 with an arm 20 formed at 16 to provide a stop finger 21 for engaging the end of the extinguisher 1 to hold it in the saddle.

Figure 1:
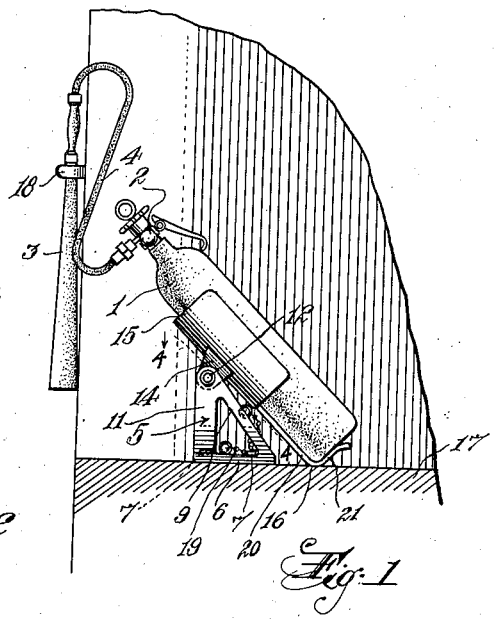
Figure 1 is a side view of an extinguisher carried in one form of my mounting or holder which is supported by a floor member of the chassis.
Figure 4:
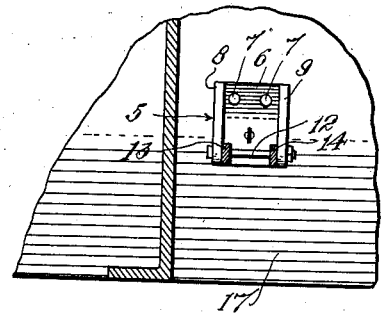
Figure 4 is a view on the line 4—4 of Figure 1.
Figure 3:
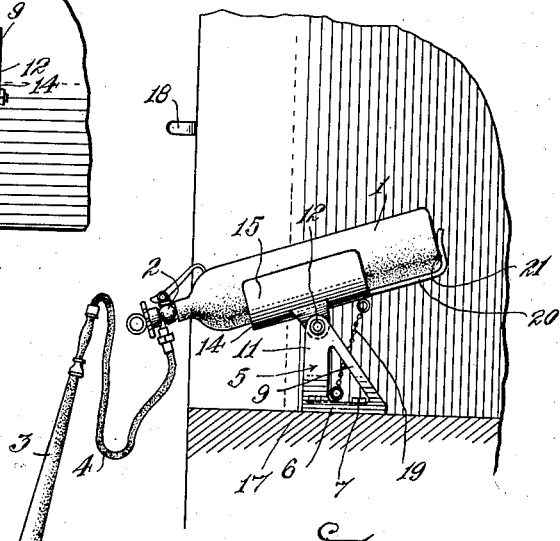
Figure 3 is a view of the device shown in Figure 1, with the extinguisher tilted to the discharge position.

As shown in Figure 1, the extinguisher is so located that the stop finger 21 engages the floor member 17. When it is desired to use the extinguisher without removing it from the holder, the spray nozzle 3 may be quickly removed from the holder 18, fastened to a member of the vehicle, and the extinguisher tilted to the position shown in Figure 3, the amount of tilting being regulated by a flexible member 19 such as a suitable type of chain which is fastened to one end of the saddle 15, while the other end is fastened to the base portion 6 of the bracket 5. If necessary, the extinguisher may be pulled out of the saddle 15 for use where the hose 4 is not long enough to extend to the proximity of the fire.

In Figure 5, two stop chains 22 and 23 are provided, the chain 22 limiting the position of the extinguisher shown in Figure 5, while the chain 23 limits the tilting position shown in Figure 7. In this case, the bracket 24 is somewhat differently constructed than the bracket 5 in Figure 1, but the saddle 15 is connected thereto in the same manner as in Figure 1.

In Figure 8, the saddle is the same as in Figure 7, but the bracket 25 is made so as to extend upwardly from one side of the extinguisher 1 to the ceiling 26, where it is fastened in any satisfactory manner as by bolts or screws 27. In this figure a bolt 28 is used to locate the extinguisher 1 in its normal and non-working position, while a bolt 29 carried by the bracket 25 limits the tilting position of the extinguisher. In other words, the bolts 28 and 29 take the place of the chains 22 and 23 shown in Figure 7.

The bracket or brackets which carry the saddle 15 are preferably positioned just within one side of the vehicle, back of the cab or driver's seat so that the extinguisher can be readily and quickly reached for use.

In Figures 10 and 11 I have shown how a large and relatively heavy fire extinguisher, such as used on a vehicle of the Couse design heretofore referred to, may be very easily handled by the use of the bracket mounting herein shown and described, it being understood that the saddle 15 does not unduly grip the extinguisher which is largely held in the saddle by its own weight, thereby allowing it to be easily pulled out of the saddle when the same is tipped to the position shown in Figure 11 which illustrates an operator, whose outline is given in dotted lines, as ready to run with the extinguisher.

What I claim is:

1. Means for mounting a hand fire extinguisher in a vehicle comprising a bracket having a base part adapted to be fastened to a frame member of the vehicle, members extending from the base portion, a self-gripping arcuately formed saddle for gripping around its central portion and holding the extinguisher securely, the saddle having a free open end to allow the extinguisher to be easily pulled endwise out of the saddle at this open end, a pair of spaced lugs extending from the saddle, and a pivot bolt passing through said lugs and said extending members.

2. Means for mounting a hand fire extinguisher in a vehicle comprising a bracket having a base part adapted to be fastened to a frame member of the vehicle, members extending from the base portion, a self-gripping arcuately formed saddle for gripping around its central portion and holding the extinguisher securely, the saddle having a free open end to allow the extinguisher to be easily pulled endwise out of the saddle at this open end, the saddle having an arm extending rearwardly of the extinguisher with a finger projecting from the arm to engage the bottom of the extinguisher, a pair of transversely spaced lugs extending downwardly from the saddle, and a pivot bolt passing through said lugs and said extending members.

3. Means for mounting a hand fire extinguisher in a vehicle comprising a bracket having a base part adapted to be fastened to a frame member of the vehicle, members extending from the base portion, a self-gripping saddle for holding the extinguisher securely, but allowing it to be easily pulled out of the saddle, the saddle having an arm extending rearwardly of the extinguisher with a finger projecting from the arm to engage the bottom of the extinguisher, a pair of transversely spaced lugs extending downwardly from the saddle, a pivot bolt passing through said lugs and said extending members, and a pair of flexible devices attached one to each end of the saddle and their opposite ends to the bracket for limiting the two positions which the extinguisher and saddle may take.

4. Means for mounting a hand fire extinguisher in a vehicle comprising a bracket having a base part adapted to be fastened to a frame member of the vehicle, members extending from the base portion, a self-gripping saddle for holding the extinguisher securely, but allowing it to be easily pulled out of the saddle, the saddle having an arm extending rearwardly of the extinguisher with a finger projecting from the arm to engage the bottom of the extinguisher, a pair of transversely spaced lugs extending downwardly from the saddle, a pivot bolt passing through said lugs and said extending members, and a pair of spaced bolts carried by parts of the bracket for determining the two positions which the extinguisher and saddle may take.

5. Means for mounting a hand fire extinguisher comprising a mounting bracket, a U-shaped saddle for receiving and gripping the extinguisher, the saddle itself having inherent stiffness and resilience to hold the extinguisher around its central portion, and having at least one free end which will allow the extinguisher to be easily pulled out of the saddle by a straight-end pull, and pivotal means completing a union between the bracket and the saddle as and for the purpose described.

6. Means for mounting a hand fire extinguisher comprising a mounting bracket, a U-shaped saddle for receiving and gripping the extinguisher, the saddle itself having inherent stiffness and resilience to grip the extinguisher around its central portion, and also having an unobstructed end, thereby leaving one end of the extinguisher free, and pivotal means completing a union between the bracket and the saddle, the bracket being adapted to be mounted at a height whereby the extinguisher may be easily pulled from the saddle by a direct end pull on its free end onto the back or shoulder of an operator.

GEORGE M. BEIMER.